United States Patent
Park et al.

(10) Patent No.: US 9,039,919 B2
(45) Date of Patent: May 26, 2015

(54) GEL-TYPE POLYMER ELECTROLYTE FOR DYE-SENSITIZED SOLAR CELL AND DYE-SENSITIZED SOLAR CELL COMPRISING THE SAME

(71) Applicant: RESEARCH & BUSINESS FOUNDATION SUNGKYUNKWAN UNIVERSITY, Suwon-si (KR)

(72) Inventors: Jong Hyeok Park, Suwon-si (KR); Kun Seok Lee, Seoul (KR)

(73) Assignee: RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 0 days.

(21) Appl. No.: 13/855,061

(22) Filed: Apr. 2, 2013

(65) Prior Publication Data

US 2013/0330873 A1 Dec. 12, 2013

(30) Foreign Application Priority Data

Jun. 8, 2012 (KR) .................. 10-2012-0061384

(51) Int. Cl.
*H01G 9/20* (2006.01)

(52) U.S. Cl.
CPC ............. *H01G 9/2009* (2013.01); *Y02E 10/542* (2013.01); *H01G 9/2013* (2013.01); *H01G 9/2018* (2013.01); *H01G 9/2031* (2013.01); *H01G 9/2059* (2013.01)

(58) Field of Classification Search
CPC .................... H01M 2300/0085; H01G 9/2004
USPC .......... 252/62.2; 429/303, 326, 339; 136/252
See application file for complete search history.

(56) References Cited

U.S. PATENT DOCUMENTS 6,111,685 A * 8/2000 Tench et al. .................. 359/267
6,755,873 B2 * 6/2004 Mizutani et al. ............. 29/623.2

FOREIGN PATENT DOCUMENTS

| | | |
|---|---|---|
| JP | 2006-313656 A | 11/2006 |
| KR | 10-2003-0065957 A | 8/2003 |
| KR | 10-2006-0082585 A | 7/2006 |
| KR | 10-2010-0039637 A | 4/2010 |
| KR | 10-2010-0091035 A | 8/2010 |

OTHER PUBLICATIONS

Derwent abstract for KR 2004098269, Nov. 20, 2004, Derwent Account No. 2005-239022.*
Lee, Kun Seok et al. "Controlled Dissolution of Polystyrene Nanobeads: Transition from Liquid Electrolyte to Gel Electrolyte." *Nano letters* 12.5 (2012): (7 pgs.).

* cited by examiner

*Primary Examiner* — Carol M Koslow
(74) *Attorney, Agent, or Firm* — NSIP Law

(57) ABSTRACT

The present disclosure relates to gel-type polymer electrolyte for a dye-sensitized solar cell, a dye-sensitized solar cell comprising the gel-type polymer electrolyte, and a method for manufacturing the dye-sensitized solar cell.

12 Claims, 10 Drawing Sheets

(a)          (b)

(a)            (b)

US 9,039,919 B2

GEL-TYPE POLYMER ELECTROLYTE FOR DYE-SENSITIZED SOLAR CELL AND DYE-SENSITIZED SOLAR CELL COMPRISING THE SAME

CROSS-REFERENCE TO RELATED APPLICATION

This application claims the benefit of Korean Patent Application No. 10-2012-0061384 filed on Jun. 8, 2012, the entire disclosure of which is incorporated herein by reference for all purposes.

FIELD OF THE INVENTION

The present disclosure relates to gel-type polymer electrolyte for a dye-sensitized solar cell, a dye-sensitized solar cell including the gel-type polymer electrolyte, and a method for manufacturing the dye-sensitized solar cell.

BACKGROUND OF THE INVENTION

Dye-sensitized solar cells (DSSCs) having a network of $TiO_2$ nanoparticles in a surface contact state have widely attracted scientific and technical attention since they are cheap and have high efficiency and have been considered as an alternative to conventional inorganic optoelectronic devices. However, applications thereof are limited due to actual problems such as leakage of a liquid electrolyte. To solve such a problem, electrolyte solidification has been researched as a main subject. Two different types of electrolyte solidification have been reported. Firstly, DSSCs in a solid state as a whole have been used without a solvent. However, a solid electrolyte has a low ionic conductivity, and, thus, provides a relatively low cell performance. As an alternative thereto, quasi-solid DSSCs filled with a gel-type electrolyte have been reported. Polymers such as poly(ethylene oxide), poly(methyl metacrylate), and poly(vinylidene fluoride-co-hexafluropropylene) (PVDF-HFP) have been widely used as additives for solidification of liquid electrolytes. The PVDF-HFP among these polymers can be easily prepared with an excellent mechanical strength and a high ionic conductivity. As an alternative, a quasi-electrolyte containing a small molecular organic gel and $SiO_2$ nanoparticles have received attention [Korean Patent Application Publication No. 10-2003-065957]. If nano-sized particles are added to such a liquid electrolyte to form a thixotropic fluid, a viscosity is increased, surface contact between an electrode and the electrolyte is improved, and a mobility is decreased. However, conversion efficiencies of most solid DSSCs are about 8%, whereas conversion efficiencies of liquid electrolyte-based DSSCs are about 12%. This is because permeation into a mesoporous $TiO_2$ film is not carried out well due to a high viscosity and a steric effect and surface contact between the electrolyte and the $TiO_2$ nanostructure does not occur well.

BRIEF SUMMARY OF THE INVENTION

In view of the foregoing, some illustrative embodiments of the present disclosure provide a gel-type polymer electrolyte for a dye-sensitized solar cell, a dye-sensitized solar cell including the gel-type polymer electrolyte, and a method for manufacturing the dye-sensitized solar cell. However, problems to be solved by the present disclosure are may not be limited to the above-described problems. Although not described herein, other problems to be solved by the present disclosure can be clearly understood by those skilled in the art from the following description.

In accordance with a first aspect of the present disclosure, there is provided a gel-type polymer electrolyte for a dye-sensitized solar cell, formed from a gelation of a polymer colloid by an electrolytic solution.

Further, in accordance with a second aspect of the present disclosure, there is provided a manufacturing method of a dye-sensitized solar cell, including: forming a polymer colloid layer on a counter electrode; forming a semiconductor electrode on the polymer colloid layer; and injecting a electrolytic solution into the polymer colloid layer, wherein the polymer colloid is gelated by the electrolytic solution.

Furthermore, in accordance with a third aspect of the present disclosure, there is provided a dye-sensitized solar cell including a gel-type polymer electrolyte according to the first aspect of the present disclosure.

According to a gel-type polymer electrolyte of the illustrative embodiments, a liquid electrolyte can be easily converted into a gel-type electrolyte by dissolving a polymer colloid in an organic solvent electrolyte solution. The gel-type polymer electrolyte of the illustrative embodiments is formed by coating a counter electrode with a polymer colloid, assembling a cell, and injecting an electrolyte solution. The electrolyte solution permeates into a nanostructure of the polymer colloid and can be in good contact with the counter electrode. Further, the liquid electrolyte solution permeates into a mesoporous structure of a semiconductor film made of, for example, $TiO_2$ and then the polymer colloid is dissolved and gelated, and, thus, the electrolyte can be in good contact with both electrodes. Furthermore, while the liquid electrolyte is converted into the gel-type electrolyte, the polymer colloid has a large contact area with respect to the electrolyte due to its large surface area, and, thus, most of the polymers can be easily dissolved in the liquid electrolyte. Therefore, according to the gel-type polymer electrolyte of the illustrative embodiments, a liquid electrolyte can be easily converted into a gel-type electrolyte and the gel-type polymer electrolyte has efficiency substantially equal to that of a conventional liquid electrolyte. Accordingly, the gel-type polymer electrolyte can improve electrochemical stability of solar cells.

BRIEF DESCRIPTION OF THE DRAWINGS

Non-limiting and non-exhaustive embodiments will be described in conjunction with the accompanying drawings. Understanding that these drawings depict only several embodiments in accordance with the disclosure and are, therefore, not to be intended to limit its scope, the disclosure will be described with specificity and detail through use of the accompanying drawings, in which.

DETAILED DESCRIPTION OF THE INVENTION

Figure 1:
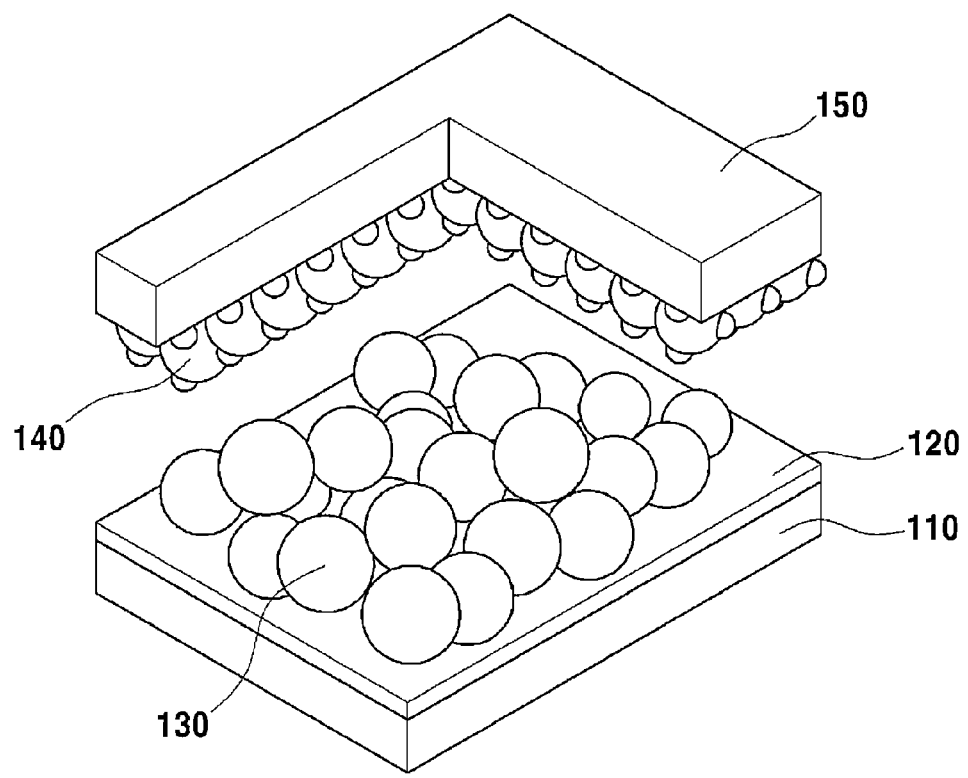
FIG. 1 is a cross-sectional view of a dye-sensitized solar cell in accordance with an illustrative embodiment.

Hereinafter, illustrative embodiments and examples of the present disclosure will be described in detail with reference to the accompanying drawings, so that the present disclosure may be readily implemented by those skilled in the art.

However, it is to be noted that the present disclosure is may not be limited to the embodiments and the examples but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element.

Through the whole document, the term "on" that is used to designate a position of one element with respect to another element includes both a case that the one element is adjacent to the another element and a case that any other element exists between these two elements.

Further, the term "comprises or includes" and/or "comprising or including" used in the document means that one or more other components, steps, operation and/or existence or addition of elements are not excluded in addition to the described components, steps, operation and/or elements unless context dictates otherwise.

The term "about or approximately" or "substantially" is intended to have meanings close to numerical values or ranges specified with an allowable error and intended to prevent accurate or absolute numerical values disclosed for understanding of the present disclosure from being illegally or unfairly used by any unconscionable third party. Through the whole document, the term "step of" does not mean "step for".

Through the whole document, the term "combination of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Through the whole document, a phrase in the form "A and/or B" means "A, B, or A and B".

In accordance with a first aspect of the present disclosure, there is provided a gel-type polymer electrolyte for a dye-sensitized solar cell, formed from a gelation of a polymer colloid by an electrolytic solution.

In accordance with an illustrative embodiment, the polymer colloid may include one selected from, but may not be limited to, the group consisting of polystyrene, polyethylene, polypropylene, poly(vinylidene fluoride) (PVDF), polyacrylonitrile (PAN), poly(ethylene oxide)(PEO), and their combinations. The polymer colloid may be synthesized by dispersion polymerization and may have a diameter in a range of from about 10 nm to about 500 nm, for example, but may not be limited to, from about 50 nm to about 500 nm, from about 100 nm to about 500 nm, from about 150 nm to about 500 nm, from about 200 nm to about 500 nm, from about 300 nm to about 500 nm, from about 10 nm to about 400 nm, from about 10 nm to about 300 nm, from about 10 nm to about 200 nm, or from about 10 nm to about 100 nm.

In accordance with an illustrative embodiment, the electrolyte solution receives an electron from the counter electrode and transfers the received electron to a dye molecule which lost an electron through oxidation and reduction. To be specific, an iodide/triodide pair of the electrolyte solution receives an electron from the counter electrode and transfers the electron to the dye molecule through oxidation and reduction. Any electrolyte solution may be used without limitation if it has a hole conduction function. By way of example, the electrolyte solution may include, but may not be limited to, an organic solvent.

Any organic solvent may be used without limitation if it can dissolve the polymer colloid. By way of example, the organic solvent may include, but may not be limited to, a nitrile-based solvent. The nitrile-based solvent may include one selected from, but may not be limited to, the group consisting of acetonitrile, propionitrile, butyronitrile, t-butyl cyanide, valeronitrile, caprylonitrile (or heptylcyanide), heptanenitrile, cyclopentane carbonitrile, cyclohexane carbonitrile, 2-fluorobenzonitrile, 4-fluorobenzonitrile, difluorobenzonitrile, trifluorobenzonitrile, 2-chlorobenzonitrile, 4-chlorobenzonitile, dichlorobenzonitile, trichlorobenzonitrile, 2-chloro-4-fluorobenzonitrile, 4-chloro-2-fluorobenzonitrile, phenylacetonitrile, 2-fluorophenylacetonitrile, 4-fluorophenylacetonitrile, and their combinations.

In accordance with an illustrative embodiment, the organic solvent may include a mixture of acetonitrile and valeronitrile, and acetonitrile and valeronitrile are mixed at a ratio of, for example, but may not be limited to, about 85 vol %:about 15 vol %. By way of example, the electrolyte solution may be prepared by dissolving four chemical reagents including 0.6 M of BMII (1-butyl-3-methylimidazolium iodide), 0.03 M of $I_2$. (Iodine), 0.1 M of GSCN (guanidiumthiocyanate), 0.5 M of TBP (4-tert-buthylpyridine) in a mixed solution (volume ratio of about 85:15) of acetonitrile (ACN) and valeronitrile (VN), but the present disclosure may not be limited thereto.

In accordance with an illustrative embodiment, the polymer colloid may be, but may not be limited to, from about 0.1 to about 50 parts by weight with respect to 100 parts by weight of the gel-type polymer electrolyte. By way of example, the polymer colloid may be, but may not be limited to, from about 0.1 to about 50 parts by weight, from about 0.5 to about 50 parts by weight, from about 1 to about 50 parts by weight, from about 5 to about 50 parts by weight, from about 10 to about 50 parts by weight, from about 20 to about 50 parts by weight, from about 30 to about 50 parts by weight, from about 40 to about 50 parts by weight, from about 0.1 to about 40 parts by weight, from about 0.1 to about 30 parts by weight, from about 0.1 to about 20 parts by weight, from about 0.1 to about 10 parts by weight, from about 0.1 to about 5 parts by weight, or from about 0.1 to about 1 parts by weight with respect to 100 parts by weight of the gel-type polymer electrolyte.

In accordance with an illustrative embodiment, the organic solvent may be, but may not be limited to, from about 1 to about 50 parts by weight with respect to 100 parts by weight of the gel-type polymer electrolyte. By way of example, the organic solvent may be, but may not be limited to, from about 1 to about 50 parts by weight, from about 5 to about 50 parts by weight, from about 10 to about parts by weight, from about 20 to about 50 parts by weight, from about 30 to about 50 parts by weight, from about 40 to about 50 parts by weight, from about 1 to about 40 parts by weight, from about 1 to about 30 parts by weight, from about 1 to about 20 parts by weight, from about 1 to about 10 parts by weight, or from about 1 to about 5 parts by weight with respect to 100 parts by weight of the gel-type polymer electrolyte.

Figure 3:
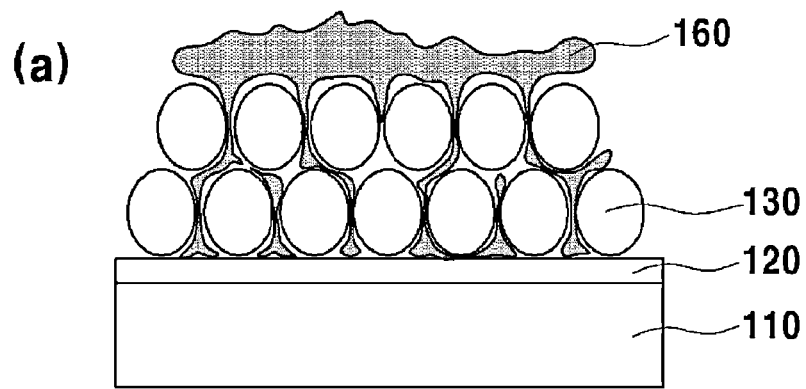
FIGS. 3(a) and 3(b) illustrate a manufacturing process of a gel-type polymer electrolyte in accordance with an illustrative embodiment.
Figure 3:
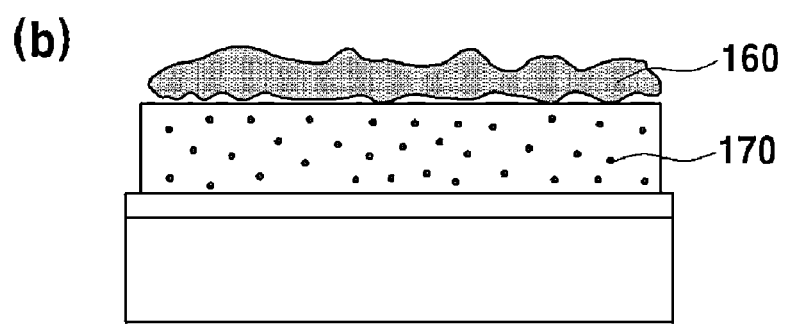
Figure 5:
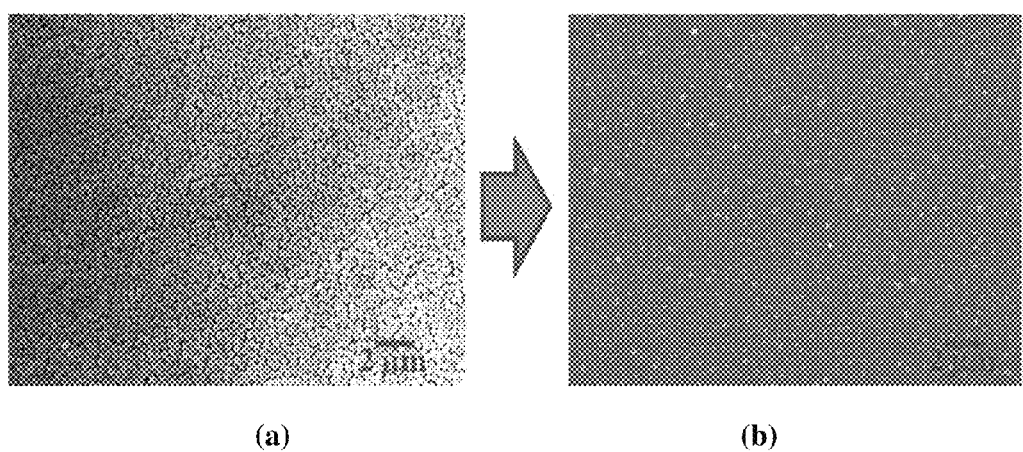
FIGS. 5(a) and 5(b) provide SEM images of a PS colloid (a) coating a counter electrode of a dye-sensitized solar cell and a PS colloid (b) dissolved after permeation of an electrolyte solution in accordance with an example.

In accordance with an illustrative embodiment, the polymer colloid may be dissolved in the organic solvent to form a gel including a small polymer particle, but the present disclosure may not be limited thereto. FIG. 3 schematically illustrates a manufacturing process of a gel-type polymer electrolyte in accordance with an illustrative embodiment, and FIG. 5 illustrates a polymer colloid and a polymer colloid dissolved in an organic solvent. It can be seen that a particle of the polymer colloid is dissolved in an organic solvent to form gel including a small polymer particle.

In accordance with a second aspect of the present disclosure, there is provided a manufacturing method of a dye-sensitized solar cell, including: forming a polymer colloid layer on a counter electrode; forming a semiconductor electrode on the polymer colloid layer; and injecting a electrolytic solution into the polymer colloid layer, wherein the polymer colloid is gelated by the electrolytic solution.

In accordance with an illustrative embodiment, the polymer colloid may include one selected from, but may not be limited to, the group consisting of polystyrene, polyethylene, polypropylene, PVDF, PAN, PEO, and their combinations. The polymer colloid may be synthesized by dispersion polymerization and may have a diameter in a range of from about 10 nm to about 500 nm, for example, but may not be limited to, from about 50 nm to about 500 nm, from about 100 nm to about 500 nm, from about 150 nm to about 500 nm, from about 200 nm to about 500 nm, from about 300 nm to about 500 nm, from about 10 nm to about 400 nm, from about 10 nm to about 300 nm, from about 10 nm to about 200 nm, or from about 10 nm to about 100 nm.

In accordance with an illustrative embodiment, the electrolyte solution receives an electron from the counter electrode and transfers the received electron to a dye molecule which lost an electron through oxidation and reduction. To be specific, an iodide/triodide pair of the electrolyte solution receives an electron from the counter electrode and transfers the electron to the dye molecule through oxidation and reduction. Any electrolyte solution may be used without limitation if it has a hole conduction function. By way of example, the electrolyte solution may include, but may not be limited to, an organic solvent.

Any organic solvent may be used without limitation if it can dissolve the polymer colloid. By way of example, the organic solvent may include, but may not be limited to, a nitrile-based solvent. The nitrile-based solvent may include one selected from, but may not be limited to, the group consisting of acetonitrile, propionitrile, butyronitrile, t-butyl cyanide, valeronitrile, caprylonitrile (caprylonitrile or heptylcyanide), heptanenitrile, cyclopentane carbonitrile, cyclohexane carbonitrile, 2-fluorobenzonitrile, 4-fluorobenzonitrile, difluorobenzonitrile, trifluorobenzonitrile, 2-chlorobenzonitrile, 4-chlorobenzonitile, dichlorobenzonitile, trichlorobenzonitrile, 2-chloro-4-fluorobenzonitrile, 4-chloro-2-fluorobenzonitrile, phenylacetonitrile, 2-fluorophenylacetonitrile, 4-fluorophenylacetonitrile, and their combinations.

In accordance with an illustrative embodiment, the electrolyte solution may include a mixture of acetonitrile and valeronitrile, and acetonitrile and valeronitrile are mixed at a ratio of, for example, but may not be limited to, about 85 vol %:about 15 vol %. By way of example, the electrolyte solution may be prepared by dissolving four chemical reagents including 0.6 M of BMII (1-butyl-3-methylimidazolium iodide), 0.03 M of $I_2$. (Iodine), 0.1 M of GSCN (guanidiumthiocyanate), 0.5 M of TBP (4-tert-buthylpyridine) in a mixed solution (volume ratio of about 85:15) of acetonitrile (ACN) and valeronitrile (VN), but the present disclosure may not be limited thereto.

In accordance with an illustrative embodiment, the polymer colloid may be dissolved in the electrolyte solution to form a gel including a small polymer particle, but the present disclosure may not be limited thereto. FIG. 3 schematically illustrates a manufacturing process of a gel-type polymer electrolyte in accordance with an illustrative embodiment, and FIG. 5 illustrates a polymer colloid and a polymer colloid dissolved in an organic solvent. It can be seen that a particle of the polymer colloid is dissolved in an organic solvent to form gel including a small polymer particle.

Figure 4:
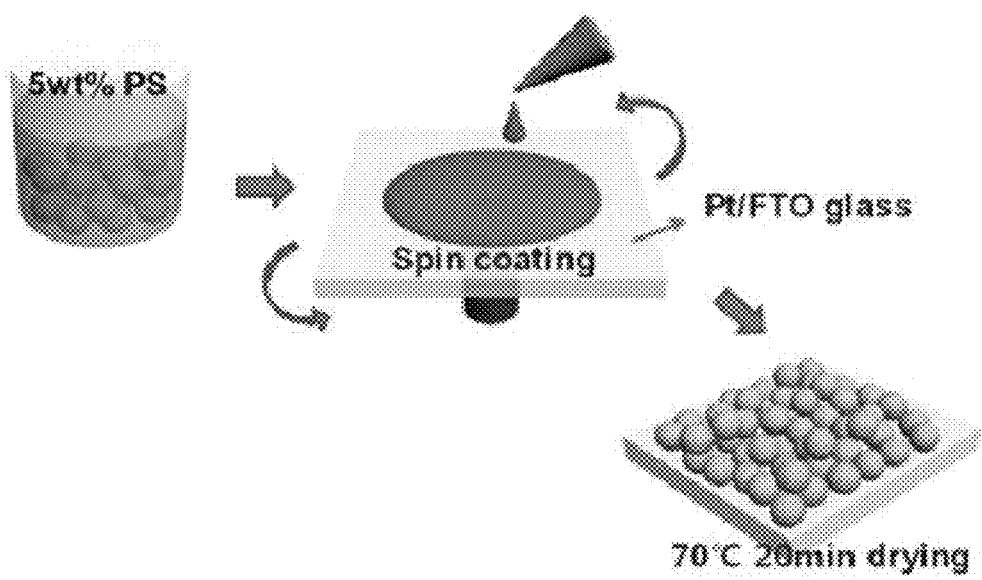
FIG. 4 schematically illustrates a process of coating a counter electrode of a dye-sensitized solar cell with a polymer colloid in accordance with an example.

In accordance with an present disclosure, the polymer colloid may be coated on the counter electrode by, but may not be limited to, spin coating, dip coating, slot die coating, and spray coating. FIG. 4 schematically illustrates a process of coating a counter electrode of a dye-sensitized solar cell with a polymer colloid in accordance with an present disclosure. A solution prepared by dissolving a polymer colloid in water or alcohol may be spin-coated on the counter electrode and then dried at about 70° C. for about 20 minutes, thereby coating the counter electrode with the polymer colloid.

In accordance with a third aspect of the illustrative embodiments, there is provided a dye-sensitized solar cell including a gel-type polymer electrolyte according to the first aspect of the illustrative embodiments.

Hereinafter, illustrative embodiments and examples of a gel-type polymer electrolyte for a dye-sensitized solar cell, a dye-sensitized solar cell including the gel-type polymer electrolyte, and a method for manufacturing the dye-sensitized solar cell will be explained in detail with reference to FIGS. 1 to 3. However, the present disclosure may not be limited thereto.

FIG. 1 is a cross-sectional view of a dye-sensitized solar cell in accordance with an illustrative embodiment. A dye-sensitized solar cell includes a lower substrate 110, a counter electrode 120 formed on the lower substrate 110, a polymer colloid 130 formed on the counter electrode 120, a semiconductor electrode 140 adsorbing a dye formed on a layer of the polymer colloid 130, and an upper substrate 150 formed on the semiconductor electrode 140. After the dye-sensitized solar cell is prepared as described above, an electrolyte solution is injected into the polymer colloid 130, the polymer colloid 130 is dissolved to form a gel including a small polymer particle.

In accordance with an exemplary embodiment, there may be provided a dye-sensitized solar cell using conductive substrates as the upper and lower substrates, a platinum catalyst layer as the counter electrode, and polystyrene (PS) as the polymer colloid. Thus, the PS colloid may be coated on the counter electrode and an organic solvent electrolyte solution may be injected to dissolve the PS colloid, thereby forming a gel-type electrolyte including a small PS particle.

Figure 2:
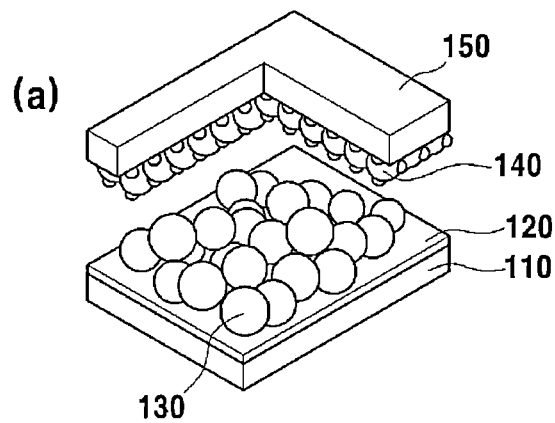
FIGS. 2(a), 2(b), and 2(c) are schematic diagrams showing a manufacturing process of a dye-sensitized solar cell in accordance with an illustrative embodiment.
Figure 2:
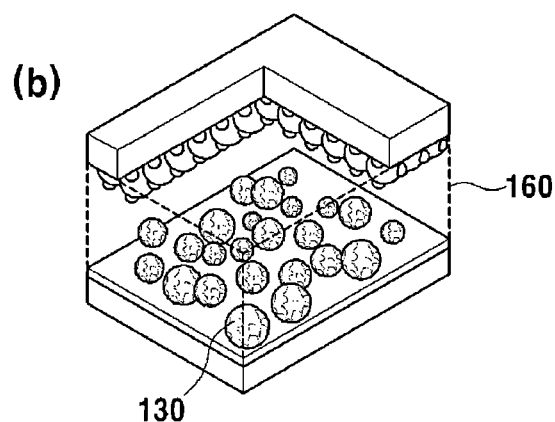
Figure 2:
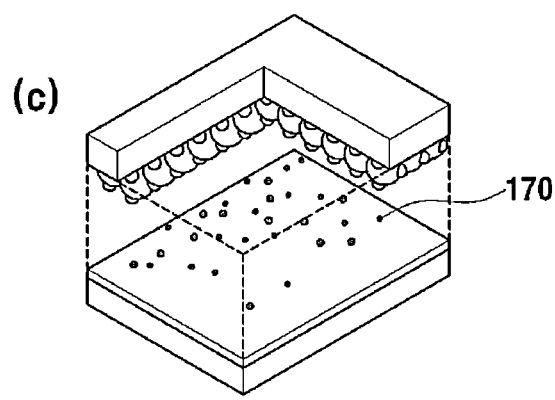

FIG. 2 is a schematic diagram showing a manufacturing process of a dye-sensitized solar cell in accordance with an illustrative embodiment. A dye-sensitized solar cell is manufactured by (a) coating the polymer colloid 130 on the counter electrode 120 formed on the lower substrate 110 to form a polymer colloid layer and forming the semiconductor electrode 140 adsorbing a dye and the upper electrode 150 to assembly a dye-sensitized solar cell; (b) injecting a electrolytic solution 160 into the polymer colloid 130; and (c) forming a gel-type electrolyte 170 including a small polymer particle by dissolving the polymer colloid 130 in the electrolyte solution 160. FIG. 3 schematically illustrates a process in which the polymer colloid 130 is dissolved in the electrolyte solution 160 to form the gel 170. The electrolyte solution 160 permeates among particles of the polymer colloid 130 so as to be in good contact with the counter electrode 120, and the electrolyte solution 160 effectively dissolves the polymer colloid 130 so as to form the gel 170 including a small polymer particle.

In accordance with an exemplary embodiment, it may be possible to manufacture a solar cell by using a Pt/FTO composite as a counter electrode, $TiO_2$/FTO adsorbing a dye as a semiconductor electrode, and a polystyrene (PS) colloid as a polymer colloid, and coating the counter electrode with the PS colloid and forming the semiconductor electrode adsorbing a dye. Then, an organic solvent electrolyte solution is injected to the PS colloid to dissolve the PS colloid. The PS colloid is dissolved in the organic solvent electrolyte solution except a small PS particle, thereby forming a gel-type electrolyte.

In accordance with an exemplary embodiment, the dye may include a photosensitive dye. Any photosensitive dye may be used without limitation if it can absorb solar energy and move an electron to an excited state energy level. By way of example, the dye may include, but may not be limited to, an organic metallic composite including aluminum (Al), platinum (Pt), palladium (Pd), europium (Eu), lead (Pb), iridium (Ir), ruthenium (Ru), and the like. By way of example, Ru(etc bpy)$_2$(NCS)$_2$.H$_3$CN has been generally used as the dye. Herein, "etc" represents a reaction group such as (COOEt)$_2$ or (COOH)$_2$ which can be bonded to a surface of the semiconductor electrode. Further, the dye may include an organic coloring or the like. By way of example, the organic coloring may include coumarin, porphyrin, xanthene, riboflavin, triphenylmethane, and the like. These colorings may be used alone or mixed with a Ru composite to improve visible light absorption at a long wavelength, thereby further increasing photoelectric conversion efficiency.

Hereinafter, an example of the present disclosure will be provided for more detailed explanation. However, the present disclosure may not be limited thereto.

EXAMPLES

Example 1

Manufacturing of Dye-Sensitized Solar Cell

1. Preparing Polystyrene (PS) Colloid

A PS colloid was synthesized by dispersion polymerization of styrene. 1 M of styrene monomer and 2,2'-azobis(2-methyl butyro nitrile) (monomer of about 1 wt %) as an initiator were dissolved in ethanol. A size of a colloid particle was adjusted to be from about 200 nm to about 300 nm by using 0.04 g (per 100 ml of ethanol) of poly-(N-vinylpyrrolidone) (Mw=49,000) as a stabilizer. The prepared PS colloid was dissolved in distilled water or ethanol at a concentration of about 5 wt % to prepare a PS colloid solution.

2. Preparing Counter Electrode

About 10 mM to about 20 mM of H$_2$PtCl$_6$/isopropanol solution was coated on a transparent electrode and a firing process was performed at about 450° C. for about 30 minutes, and platinum (Pt) was reduced on a surface of a counter electrode. Then, the PS colloid solution was spin-coated (1500 rpm, 30 sec) on the counter electrode on which platinum (Pt) was reduced. Thereafter, the counter electrode was dried at about 70° C. for about 5 minutes to about 10 minutes to remove remaining moisture.

3. Preparing Semiconductor Electrode

A $TiO_2$.nanoparticle paste (paste formed by a sol-gel method) was coated to a thickness of about 15 μm on a transparent electrode substrate by means of a doctor-blade method and fired at about 550° C. for about 30 minutes. A semiconductor film coated with a $TiO_2$.nanoparticle film was immersed in an ethanol solution including a photosensitive dye molecule at about 25° C. for about 18 hours to adsorb a dye.

4. Manufacturing of Dye-Sensitized Solar Cell

A cell was manufactured by arranging the counter electrode and the semiconductor electrode to face each other. As a spacer, ionomeric ethylene acid copolymer resin SURLYN (Dupont) having a thickness of about 60 μm was used. An electrolyte solution was injected between the semiconductor electrode and the counter electrode. As the electrolyte solution, a mixed solution (85 vol %: about 15 vol %) of acetonitrile and valeronitrile including 0.5 M of 4-tert-buthylpyridine, 0.6 M of butyl-methyl-imidazolium iodide, 0.03 M of $I_2$ (Iodine), and 0.1 M of guanidiumthiocyanate was used.

Result

FIG. 5 provides SEM images of a PS colloid (a) coated on a counter electrode of a dye-sensitized solar cell and a PS colloid (b) dissolved after permeation of an electrolyte solution in accordance with the present example. The SEM images show well-coated compact PS colloid on the counter electrode. It can be seen that after the electrolyte solution was injected, the PS colloid was dissolved well and a structure thereof was not maintained but very small PS particles remained.

Figure 6:
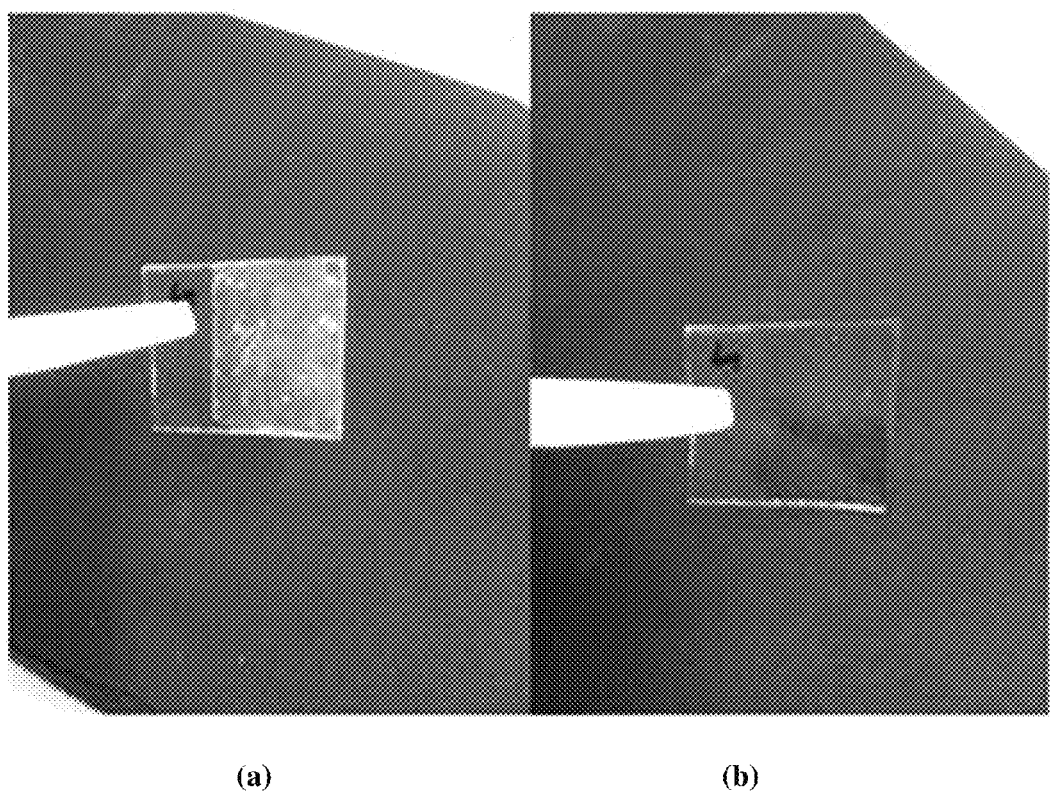
FIGS. 6(a) and 6(b) illustrate a gelation when a substrate spin-coated with a colloid is impregnated in an electrolyte in accordance with an example.

FIG. 6 illustrates a gelation when a substrate spin-coated with a colloid is impregnated in an electrolyte in accordance with the present example. It can be seen that the PS colloid (FIG. 6(a)) came into contact with the electrolyte and was converted into a gel-type colloid and also was discolored by the electrolyte (FIG. 6(b)).

Figure 7:
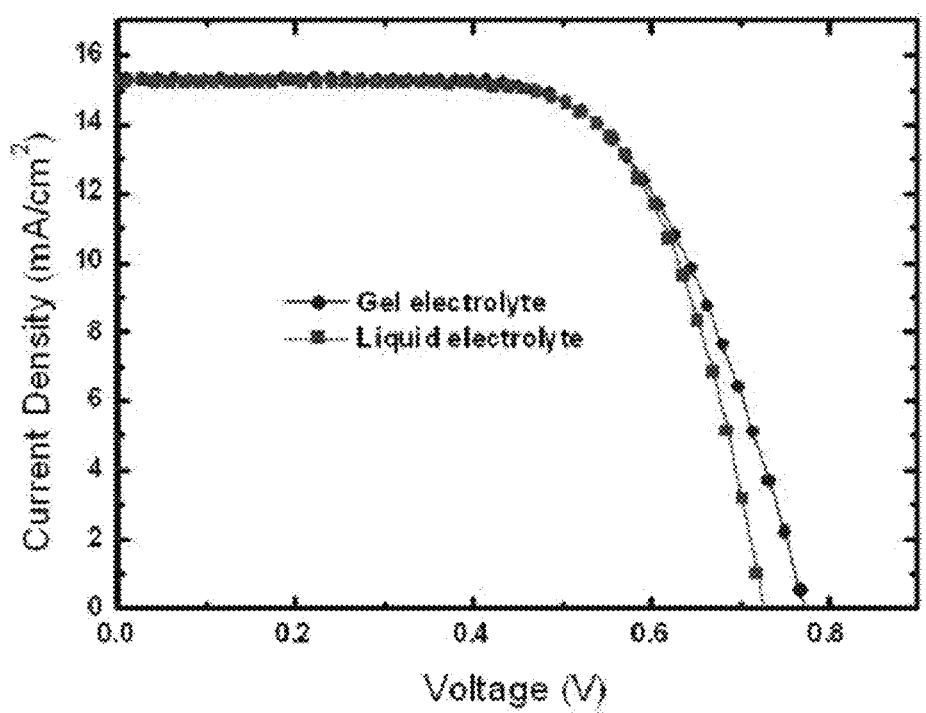
FIG. 7 provides a graph showing J-V curves of dye-sensitized solar cells using a gel-type polymer electrolyte in accordance with an example and a conventional liquid electrolyte.
Figure 8:
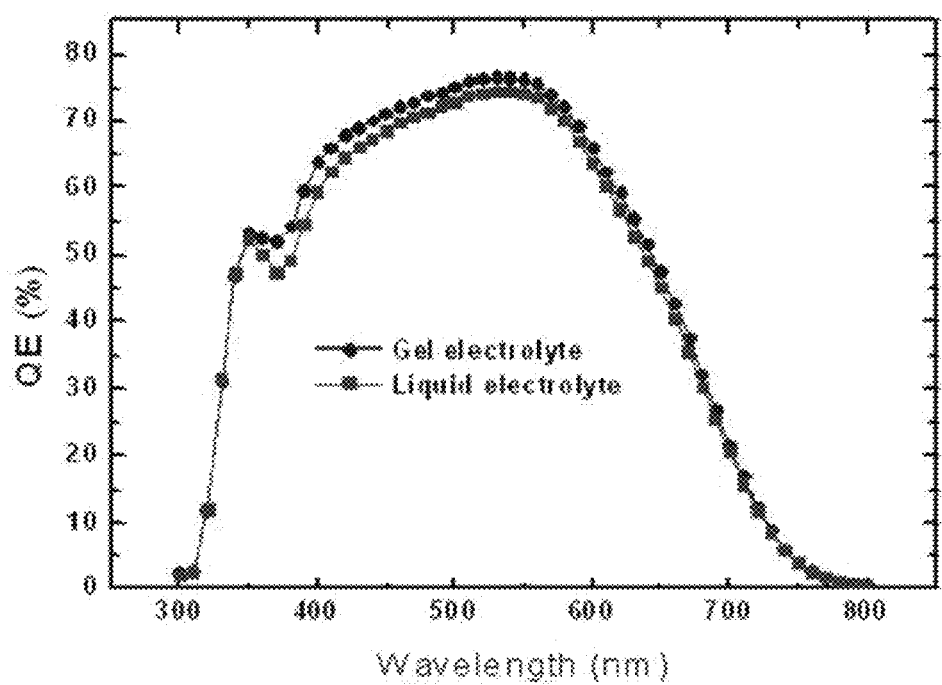
FIG. 8 provides a graph showing IPCE spectra of dye-sensitized solar cells using a gel-type polymer electrolyte in accordance with an example and a conventional liquid electrolyte.

FIG. 7 provides a graph showing J-V curves of dye-sensitized solar cells using a gel-type polymer electrolyte in accordance with the present example and a conventional liquid electrolyte under AM 1.5 conditions in a solar simulation. FIG. 8 provides a graph showing IPCE spectra of dye-sensitized solar cells using a gel-type polymer electrolyte in accordance with the present example and a conventional liquid electrolyte. The conventional liquid electrolyte had $J_{SC}$ of about 15.3 mA/cm$^2$, $V_{OC}$ of about 0.73 V, FF of about 0.68, and energy conversion efficiency of about 7.57%. The gel-type electrolyte of the present example had $J_{SC}$ of about 15.3 mA/cm$^2$, $V_{OC}$ of about 0.77 V, FF of about 0.64, and energy conversion efficiency of about 7.57%. With the gel-type electrolyte, efficiency was maintained similarly and a similar value of $J_{SC}$ was obtained. As shown in the IPCE data, the two dye-sensitized solar cells had similar photoelectric conversion efficiency. Therefore, it can be seen that even when the gel-type electrolyte was used, it did not greatly affect generation of photoelectrons. However, a value of $V_{OC}$ of the gel-type electrolyte was higher than that of the liquid electrolyte. This is because while the PS colloid was dissolved in the electrolyte solution, a PS matrix is passivating on a surface of $TiO_2$ to suppress a dark reaction for recombining a dye into an electrolyte.

Figure 9:
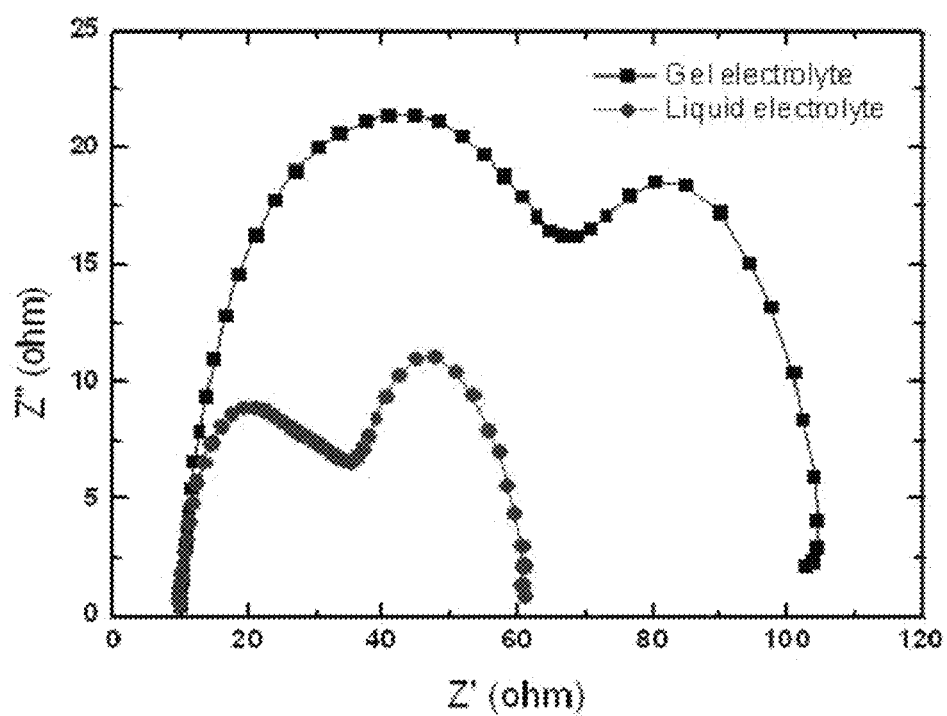
FIG. 9 provides a graph showing Nyquist plots of dye-sensitized solar cells using a gel-type polymer electrolyte in accordance with an example and a conventional liquid electrolyte.

FIG. 9 provides a graph showing Nyquist plots of dye-sensitized solar cells using a gel-type polymer electrolyte in accordance with the present example and a conventional liquid electrolyte. The reason why FF of the gel-type electrolyte was lower than that of the liquid electrolyte is deemed that Pt of the counter electrode was passivated by dissolved PS molecules, and, thus, additional resistance to transfer of an electron from the counter electrode to the electrolyte was generated. This can be seen from a measurement result of impedance. A first semi-circle of the gel-type electrolyte was higher than that of the liquid electrolyte.

Figure 10:
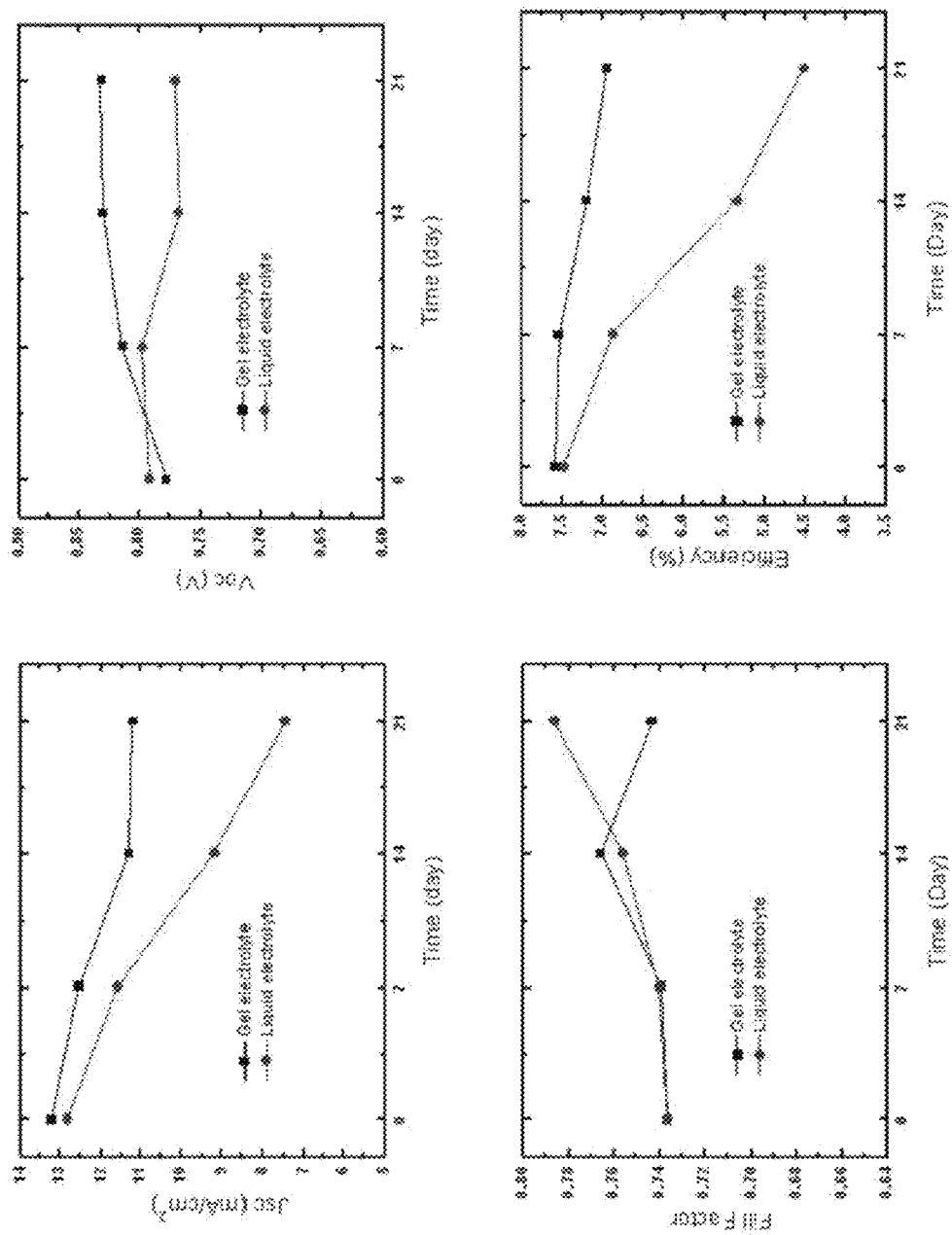
FIG. 10 provides cell performance data over time for checking long-time stability of dye-sensitized solar cells using a gel-type polymer electrolyte in accordance with an example and a conventional liquid electrolyte.

In order to check stability in a life of the gel-type polymer electrolyte in accordance with the present example and a conventional liquid electrolyte, a light soaking-aging test was performed under room-temperature air. Efficiency was measured at regular 7-day intervals. A result thereof is shown in FIG. 10. The dye-sensitized solar cell using the PS colloid gel-type electrolyte was remarkably improved in efficiency stability. $V_{OC}$ and FF were not much changed by less than about 5%. However, a cell efficiency of the liquid electrolyte was decreased to about 4.52% after 21 days from preparation of the liquid electrolyte, whereas a cell efficiency of the gel-type electrolyte was slightly decreased to about 6.95%. Transformation into a gel-type electrolyte prevents easy evaporation or leakage of a volatile liquid electrolyte, resulting in improvement of durability and a life of a cell. As a result, introduction of a gel-type electrolyte using a PS colloid has positive effects on efficiency stability of the dye-sensitized solar cell.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

What is claimed is:

1. A gel-type polymer electrolyte for a dye-sensitized solar cell, formed from a gelation of a polymer colloid by an electrolytic solution that comprises an organic solvent that includes a nitrile-based solvent.

2. The gel-type polymer electrolyte for a dye-sensitized solar cell of claim 1, wherein the polymer colloid includes one selected from the group consisting of polystyrene, polyethylene, polypropylene, PVDF, PAN, PEO, and their combinations.

3. The gel-type polymer electrolyte for a dye-sensitized solar cell of claim 1,
wherein the nitrile-based solvent includes one selected from the group consisting of acetonitrile, propionitrile, butyronitrile, t-butyl cyanide, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, 2-chlorobenzonitrile, 4-chlorobenzonitrile, dichlorobenzonitrile, trichlorobenzonitrile, 2-chloro-4-fluorobenzonitrile, 4-chloro-2-fluorobenzonitrile, phenylacetonitrile, 2-fluorophenylacetonitrile, 4-fluorophenylacetonitrile, and their combinations.

4. The gel-type polymer electrolyte for a dye-sensitized solar cell of claim 1,
wherein the organic solvent includes a mixture of acetonitrile and valeronitrile.

5. The gel-type polymer electrolyte for a dye-sensitized solar cell of claim 1,
wherein the polymer colloid is from 0.1 to 50 parts by weight with respect to 100 parts by weight of the gel-type polymer electrolyte.

6. The gel-type polymer electrolyte for a dye-sensitized solar cell of claim 1,
wherein the organic solvent is from 1 to 50 parts by weight with respect to 100 parts by weight of the gel-type polymer electrolyte.

7. A manufacturing method of a dye-sensitized solar cell, comprising:
forming a polymer colloid layer on a counter electrode;
forming a semiconductor electrode on the polymer colloid layer; and
injecting a electrolytic solution into the polymer colloid layer to form the gel-type polymer electrolyte of claim 1,
wherein the electrolytic solution includes a nitrile-based solvent.

8. The manufacturing method of a dye-sensitized solar cell of claim 7,
wherein the polymer colloid includes one selected from the group consisting of polystyrene, polyethylene, polypropylene, PVDF, PAN, PEO, and their combinations.

9. The manufacturing method of a dye-sensitized solar cell of claim 7,
wherein the nitrile-based solvent includes one selected from the group consisting of acetonitrile, propionitrile, butyronitrile, t-butyl cyanide, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, 2-chlorobenzonitrile, 4-chlorobenzonitrile, dichlorobenzonitrile, trichlorobenzonitrile, 2-chloro-4-fluorobenzonitrile, 4-chloro-2-fluorobenzonitrile, phenylacetonitrile, 2-fluorophenylacetonitrile, 4-fluorophenylacetonitrile, and their combinations.

10. The manufacturing method of a dye-sensitized solar cell of claim 7, wherein the polymer colloid is coated on the counter electrode by spin coating.

11. A dye-sensitized solar cell comprising a gel-type polymer electrolyte of claim 1.

12. The gel-type polymer electrolyte for a dye-sensitized solar cell of claim 1,
wherein the polymer colloid has a diameter in a range of from about 10 nm to about 500 nm.

* * * * *